May 17, 1932.

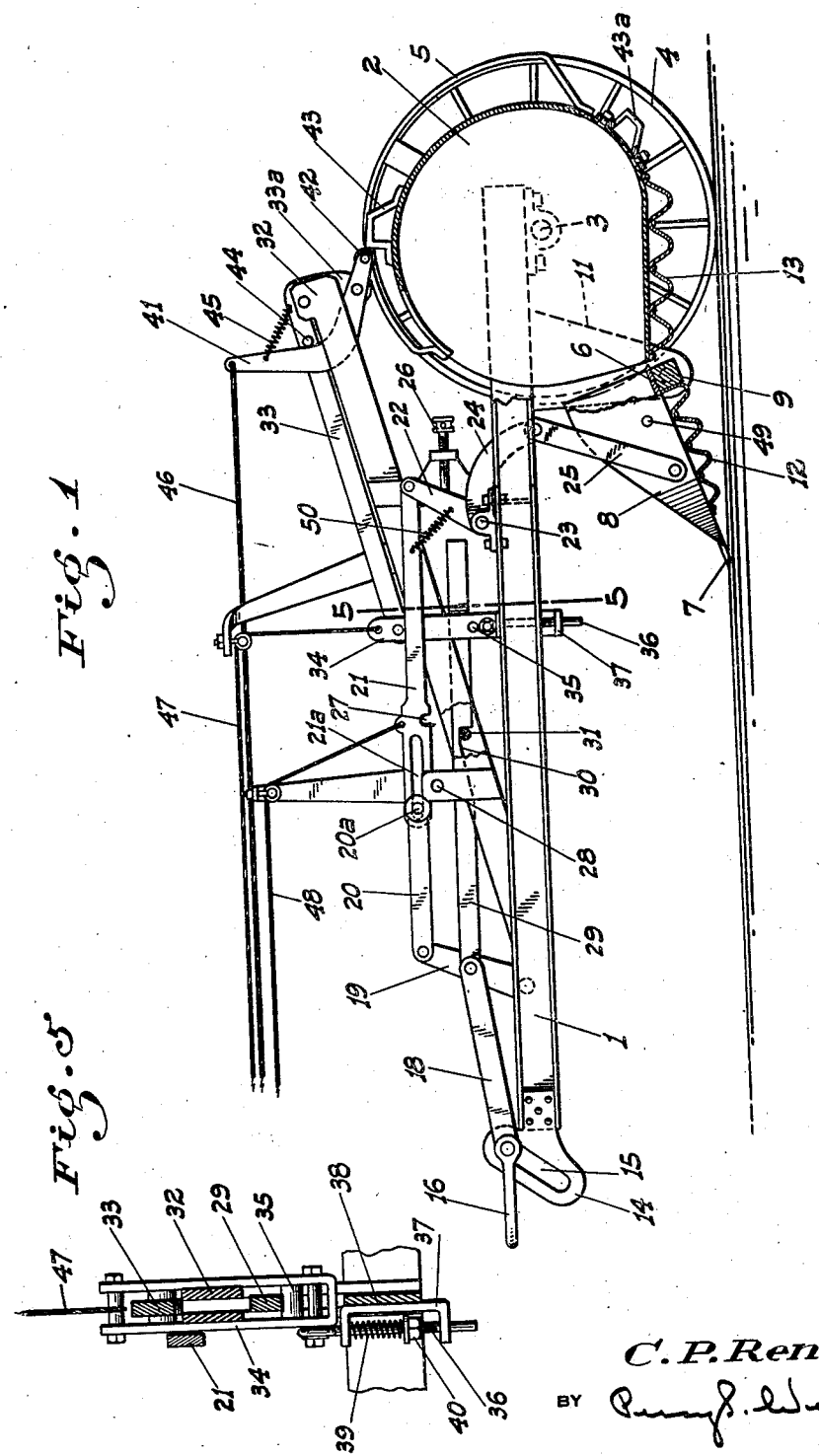

C. P. RENAUD 1,858,599

AUTOMATIC CONTROL SCRAPER

Filed March 24, 1930

INVENTOR
C. P. Renaud
BY
ATTORNEY

May 17, 1932.  C. P. RENAUD  1,858,599
AUTOMATIC CONTROL SCRAPER
Filed March 24, 1930  3 Sheets-Sheet 3

INVENTOR
C. P. Renaud
BY
ATTORNEY

Patented May 17, 1932

1,858,599

UNITED STATES PATENT OFFICE

COLLIS P. RENAUD, OF TULARE, CALIFORNIA

AUTOMATIC CONTROL SCRAPER

Application filed March 24, 1930. Serial No. 438,403.

This invention relates to scrapers of relatively large size such as are adapted to be drawn by a tractor, and particularly to a scraper of that general type having a rotating self-dumping bowl mounted on wheels, so that the load may be transported any distance in the bowl without excessive friction and consequent heavy strains on the tractor being had.

The principal object of my invention is to arrange the bowl so that the same normally clears the ground; the dirt being scraped and delivered to the bowl by a blade and apron unit separate from the bowl. The bowl is normally stationary and said bowl and its heavy load therefore do not need to be raised when scraping operations are completed, as must now be done, and the only member which has to be raised is the relatively light blade and apron unit.

A further object of the invention is to provide means, automatically controlled by the weight of a load of dirt in the bowl, for causing said blade to be raised with the forward movement of the machine when the load reaches a predetermined weight. This of course causes scraping operations to cease and the machine may then continue in its forward movement to the point where the load is to be dumped. Not only is the blade thus automatically raised without attention on the part of the operator being necessary, but when thus raised it forms a closure for the lower front portion of the bowl, thus aiding in retaining the dirt in the bowl and enabling a greater amount of dirt to be transported without danger of spilling any of such dirt than would otherwise be the case. I have further provided hand means for controlling the raising of the blade unit at any time, regardless of the weight in the bowl. Further objects of this invention will appear from a perusal of the following specification.

These objects I accomplish by means of such structure and relative arrangement of parts as will fully appear by a perusal of the following specification and claims.

In the drawings similar characters of reference indicate corresponding parts in the several views:

Fig. 1 is a side elevation of my improved scraper, parts being in section, showing the blade in its scraping position.

Fig. 2 is a similar view, showing the position of the parts after a load has been scraped into the bowl and the apron raised.

Fig. 5 is a fragmentary transverse section on the line 5—5 of Fig. 1.

Referring now more particularly to the characters of reference on the drawings, the numeral 1 denotes the side frame beams of the scraper which converge together at their forward ends, but are spaced apart sufficiently at their rear ends to receive the bowl 2 therebetween. This bowl is supported on trunnions 3 journaled on the frame, which also serve as the axles of the supporting wheels 4. The bottom of the bowl (which of course is open at the front) is normally in a substantially horizontal position and is clear of the ground; the dirt confining area of the bowl being so disposed relative to the trunnions that the greatest load carrying area is ahead of the trunnions. The bowl therefore always has a tendency to rotate forwardly and this tendency is of course greatly increased when the bowl is loaded due to the relatively greater weight of that portion of the load which is ahead of the plane of the trunnions. Runners 5 concentric with the trunnions are mounted about the upper portion of the bowl to impart positive rotation to the same when dumping, as usual.

Figure 4:
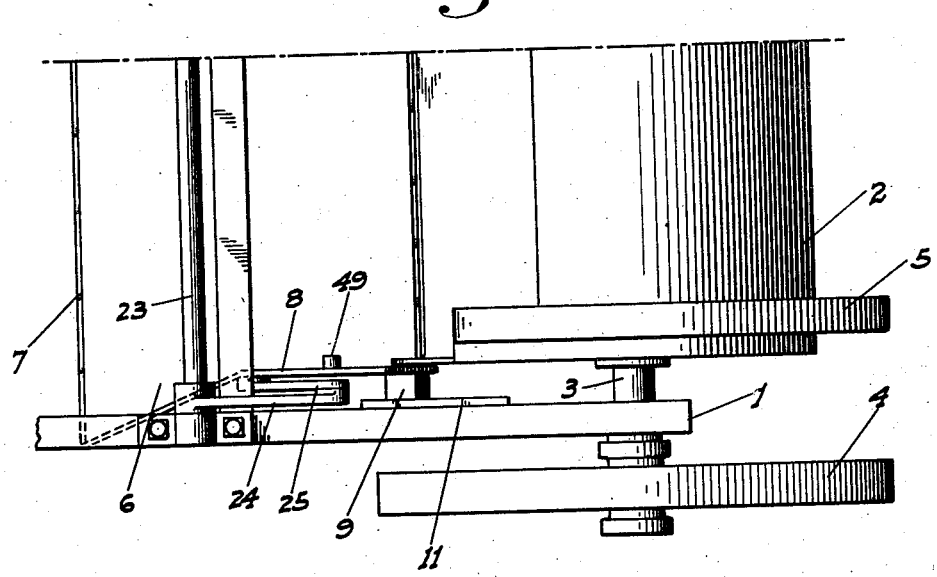
Fig. 4 is a fragmentary top plan view of the scraper at its bowl end.

Depending forwardly toward the ground from the upper edge or lip of the bowl at the normal level thereof is an apron 6, terminating at its lower forward edge in a suitable scraping blade 7. Side plates 8 project upwardly from the apron to overlap the sides of the bowl so as to confine and guide dirt on the apron from the blade into the bowl. Toward its forward end the apron flares outwardly as shown in Fig. 4 so that the blade is correspondingly wide, and dirt may be scraped to a width somewhat greater than that of the bowl. This feature enables scraping operations to be carried out nearer to fixed obstructions than would otherwise be the case, besides expediting the loading of the bowl. Under the apron at its rear end is a cross block 9 having end trunnions 10 turnable in brackets 11 secured to and depending from the beams 1. A plate 12 having vertical transversely extending corrugations as shown is rigidly secured to the bottom of the apron and to the cross block. The apron is thus strengthened, to enable one of a greater width to be used than would otherwise be the case, without any great increase in weight. A similar plate 13 braces the bottom of the bowl and for the same purpose. The adjacent edges of the bowl and apron are so disposed relative to each other that no interference with independent movements of the two to any relative position is had.

Means for controlling the movement of the apron with the load in the bowl, and for independently controlling the dumping of the bowl, is provided as follows:

At the forward end of the main frame is a fixed yoke 14 having a forwardly and downwardly extending slot 15. A clevis 16 adapted for connection to the drawhead of a tractor has roller 17 riding in the slot. A link 18 is swivelly connected to the clevis axially of the roller and to a substantially vertical arm 19 which is pivoted at its lower end on the frame. Another link 20 is pivoted on and extends rearwardly from said arm and at its rear end has a pin 20a slidable in a longitudinal slot 21a formed in a horizontal bar 21. This bar at its rear end is connected to an arm 22 projecting upwardly and radially from a cross-shaft 23 journaled on the frame above the apron 6. Other substantially horizontal arms 24 extend rearwardly from the shaft adjacent its ends and are connected to depending links 25 which at their lower ends are connected to the side plates 8 of the apron intermediate the ends of the same. Adjustable means, such as a set screw 26, engages the rear side of the arm 22 so as to limit the extent to which the latter may move rearwardly. This consequently limits the lowering movement of the apron and thus adjusts the scraping depth of the blade.

These parts are disposed so that when the roller 17 is at the top of the yoke slot, and the blade is in its lowermost position, the pin 20a is adjacent the forward end of the slot 21a. Intermediate its ends the bar 21 has a notch 27 in its under side adapted to engage a fixed pin 28, this pin being positioned so as to engage the notch only when the bar is advanced and the blade is raised to its limit of movement. Likewise pivoted to the arm 19 is another rearwardly extending bar 29 having a notch 30 intermediate its ends normally engaging a fixed pin 31. This notch engages its pin when the clevis is at the top of the yoke slot and the blade is lowered. The pull on the clevis is therefore normally transmitted through the link 18 and bar 29. The link 20 and the bar 21 are then slack, the downward strain on the scraping blade when in operation and tending to lower the blade still further being taken by the set screw 26 and the intervening parts.

Overhanging the bowl centrally of its width is an auxiliary frame beam 32 rigid with the main frame, on which a forwardly extending lever 33 is pivoted at its rear end. At its forward end this lever is connected to a depending yoke 34 which straddles the bar 29 and has a cross pin 35 passing under and adapted to engage said bar. A rod 36 is flexibly secured to and depends from the yoke, said rod being slidable through a bracket 37 which is mounted on a longitudinally extending frame beam 38 disposed between the two side beams 1. A spring 39 about the rod bears at one end against the bracket and at the other end against an adjustable nut 40 on the rod. This spring therefore tends to pull the yoke down and of course resists raising of the lever; the extent of resistance being controlled by adjusting the nut 40, which alters the tension of the spring.

The lever 33 at its rear end is provided with an extension 33a depending from the plane of the pivot connection of said lever, on the lower end of which extension a trigger arm 41 is pivoted intermediate its ends. The trigger rearwardly of its pivot is substantially horizontal, and at its rear end carries a roller 42 normally disposed in the path of a stop lug 43 fixed on top of the bowl. The rear edge of the trigger above the pivot normally bears against a stop 44 projecting laterally from the lever 33; a spring 45 between the trigger and lever acting to hold the trigger against the stop. A pull cable 46 is attached to the upper end of the trigger and extends thence forwardly to the trigger. Another similarly extending cable 47 is connected to the yoke 34 so as to enable the same to be manually raised, while a third cable 48 is connected to the bar 21 so that the latter may be manually raised.

In operation, as previously indicated, when the blade is in its normal lowered position, the clevis 16 connected to the tractor is at the top of the slot 15. As the scraper is then drawn forwardly and the bowl becomes loaded the clevis remains for the time being in its fixed position relative to the frame owing to the engagement of the pin 31 with the notched draft bar 29. As the bowl becomes loaded the lug 43 presses with ever increasing intensity against the trigger roller 42. The upper portion of the trigger cannot move rearwardly of its normal position owing to the stop pin 44. The result of said pressure against the roller 42 therefore is that the lever 33 tends to move vertically; the trigger arm and said lever and its extension 33a forming a unit moving as a whole about the pivotal connection of said lever with the frame member 32.

As the weight of the load deposited in the bowl approaches the limit of resistance of the spring 39, said lever will thus lift. This will cause the pin 35 attached to the yoke 34 to raise the bar 29 so that the pin 31 is disengaged from the bar notch 30. A continued pull on the clevis 16 will therefore cause the same to travel down the slot 15 and the link 18, arm 19, link 20, and bar 21 are moved forwardly. This movement of the bar will of course cause a corresponding movement to be imparted to the arm 22 and the apron and blade unit will be raised. As the apron approaches its fully raised position (which is determined by the length of the slot 15) the notch 27 in the bar 21 will aline with and will drop over the pin 28.

The scraper can then be moved any desired distance without further attention on the part of the operator being necessary, the upward angle assumed by the apron 6 relative to the bowl being such as to cause the same to form a very good closure for the dirt in the front lower portion of the bowl, so as to avoid the possibility of any appreciable quantity of the dirt being spilled out.

Figure 3:
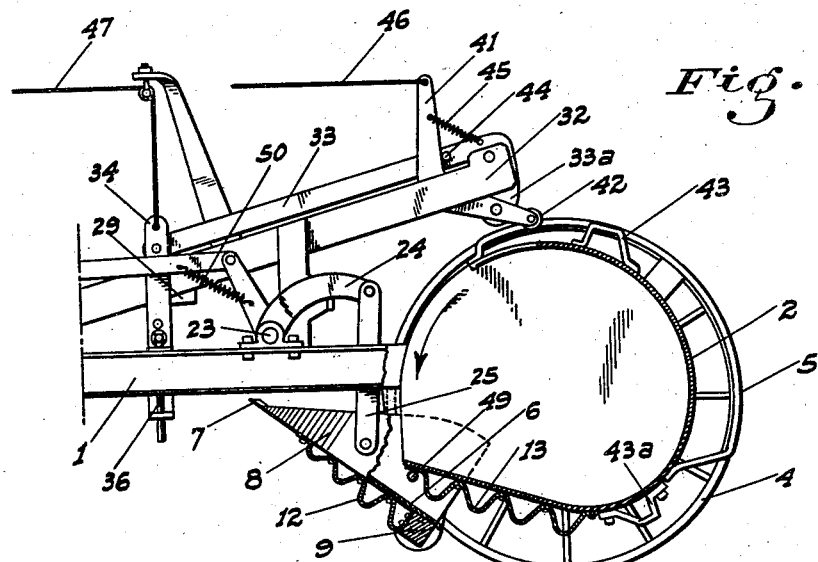
Fig. 3 is a fragmentary side elevation of the scraper showing the bowl after it has been dumped but prior to the full return of the bowl to its normal position.

When the dumping ground has been reached the operator has only to pull the cable 46, which of course will pull the upper portion of the trigger forwardly and will raise the lower rear portion to which the roller 42 is attached. This movement takes place of course without any corresponding movement of the lever 33 being had and causes the roller 42 to be disengaged from the bowl lug 43. The bowl is therefore released and will rotate of itself to dump the load; the runners as usual engaging the ground and aiding in the full rotation of the bowl and in its return to its normal position. I have found however that it is not desirable that such full rotation shall take place at this time as the lug 43 would tend to reengage the trigger roller with such violence as to possibly tend to strain the same. I have therefore provided inwardly projecting pins 49 on the side plates 8 of the apron, which pins project into the path of rotative movement of the forward edge or lip of the bowl only when the apron is in its raised position as shown in Fig. 3. The bowl is therefore halted in its rotation and cannot fully return to its normal position until the apron is again lowered, so as to move the pins 49 out of the path of the lip of the bowl.

The scraper being now emptied of its load, and the drag on the clevis 16 and corresponding parts being greatly lessened, the weight of the scraper structure will cause the frame to be lowered relative to the clevis, or in other words will cause the clevis roller 17 to return to the top of the slot 15. This will cause the link 18, arm 19, and bar 29 to be moved rearwardly, or until the said bar is again engaged by the pin 31. No movement however at this time is imparted to the bar 21, since the link 20 with its rearward movement merely moves along the slot 21a. The apron and blade therefore remain in their raised position but the clevis and its associated parts have been returned to their normal positions. Whenever it is desired to resume scraping operations it is only necessary for the operator to pull on the cable 48, which will raise the bar 21 so that the notch 27 is cleared of the pin 28. The weight of the apron in addition to the action of a tension spring 50 between the bar 21 and the arm 22 will instantly cause said apron to return to its normal scraping position; the bar 21 being of course moved rearwardly until the pin 20a again lies at the forward end of the slot 21a. The parts are then of course in the positions which they occupied at the outset of operations, and the cycle of operations can now be repeated.

If at any time it is desired to raise the blade regardless of load conditions in the bowl it is only necessary for the operator to pull on the cable 47. This will raise the yoke 34 and will cause a disengagement of the bar 29 from its holding pin 30 in exactly the same manner as was had when said yoke was raised by the movement of the lever 33.

To enable the load to be spread instead of being dumped, the bowl is provided with an additional stop-lug 43a, spaced from the lug 43 a certain distance and adjustable as to its positioning. This lug is disposed so that when engaged by the stop roller 42, the lip of the bowl will be practically in a vertical position a short distance from the ground; this distance being governed by the specific positioning of the lug 43a on the bowl.

From the foregoing description it will be readily seen that I have produced such a device as substantially fulfills the objects of the invention as set forth herein.

While this specification sets forth, in detail the present and preferred construction of the device, still in practice such deviations from such detail may be resorted to as do not form a departure from the spirit of the invention, as defined by the appended claims.

Having thus described my invention what I claim as new and useful and desire to secure by Letters Patent is:

1. A scraper including a dumping bowl normally clear of the ground, an apron and scraping blade unit separate from but movably mounted in connection with the bowl to scrape dirt and deliver the same into the bowl, and means controlled by a load of predetermined weight in the bowl for raising the unit clear of the ground with the forward movement of the scraper.

2. A scraper including a dumping bowl normally clear of the ground, an apron and scraping blade unit separate from but movably mounted in connection with the bowl to scrape dirt and deliver the same into the bowl, means for raising the unit clear of the ground with the forward movement of the scraper, and means actuated by a load of predetermined weight in the bowl for controlling the functioning of said first named means.

3. A structure as in claim 2, with separate hand operated means applied to said second named means for enabling said first named means to function irrespective of the load in the bowl.

4. A scraper including a dumping bowl normally clear of the ground, an apron and scraping blade unit separate from but movably mounted in connection with the bowl to scrape dirt and deliver the same into the bowl, means for raising the unit clear of the ground with the forward movement of the scraper, catch means normally holding said raising means inactive, and means actuated by a load of predetermined weight in the bowl for releasing said catch means.

5. A structure as in claim 4, with hand means for releasing said catch means irrespective of the load.

6. A structure as in claim 2 in which said last named means includes manually operable trip means normally preventing dumping movement of the bowl.

7. A scraper including a dumping bowl normally clear of the ground, an apron and scraping blade unit separate from but movably mounted in connection with the bowl to scrape dirt and deliver the same into the bowl, a draft element adapted for connection to a tractor and movable longitudinally relative to the bowl, connections between said element and the unit to raise the latter with the longitudinal movement of the element, catch means normally holding the element against such movement, and means actuated by a load of predetermined weight in the bowl for releasing the catch means.

8. A scraper including a frame, a bowl, trunnions turnably mounting the bowl on the frame clear of the ground and arranged to cause the greater portion of the weight and load carrying area of the bowl to be ahead of the trunnions, whereby the bowl when loaded or empty will tend to rotate forwardly, a blade and apron unit pivoted on the frame ahead of and separate from the bowl and arranged to scrape dirt and deliver the same into the front of the bowl, a draft element mounted on and movable longitudinally of the frame, connections between said element and the unit to cause the latter to be raised with the movement of the element, catch means between the element and frame normally holding said element against movement, and means controlled and actuated by a forward rotative movement of the bowl had by reason of a load of predetermined weight therein for releasing the catch means.

9. A structure as in claim 2, with means applied to said last named means to allow the same to be actuated by different load-weights selectively.

10. A scraper including a dumping bowl normally clear of the ground, an apron and scraping blade unit separate from but positioned in connection with the bowl to scrape dirt and deliver the same into the bowl, means movably mounting the unit so that it may be raised clear of the ground without disturbing the bowl, and to such a position as to cause the unit to form a closure for the lower front portion of the bowl and means to thus raise the unit.

11. A scraper including a frame, a bowl, trunnions turnably mounting the bowl on the frame clear of the ground and arranged to cause the bowl to tend to rotate forwardly, a blade and apron unit pivoted on the frame ahead of and separate from the bowl and arranged to scrape dirt and deliver the same into the bowl, means for raising said unit from engagement with the ground, releasable trip means normally preventing rotation of the bowl, and means on the unit and functioning only when the latter is raised to prevent the bowl, after having been released and rotated, from fully returning to its original position until the unit is again lowered.

12. A scraper including a frame, a bowl, trunnions turnably mounting the bowl on the frame clear of the ground and arranged to cause the bowl to tend to rotate forwardly, a blade and apron unit pivoted on the frame ahead of and separate from the bowl and arranged to scrape dirt and deliver the same into the bowl, means for raising said unit from engagement with the ground, releasable trip means normally preventing rotation of the bowl, and stops mounted on the unit normally above the normal position of the lip of the bowl and positioned to be moved into the path of rotative movement of the lip only when the unit is raised.

13. A structure as in claim 7, with releasable means holding the unit against lowering movement after it has once been raised and regardless of any retractive movement of the draft element.

14. A structure as in claim 7, with releasable means provided in part with said connections to hold the unit against lowering movement after it has once been raised and permitting the element to return to its normal position and the catch means thereof to be reengaged.

15. A scraper including a dumping bowl normally clear of the ground, a frame from which the bowl is supported, an apron and scraping blade unit depending downwardly and forwardly from in front of and normally on the level of the forward bottom edge of the bowl, and pivot means between the frame and unit connected to the latter adjacent its rear end whereby when the unit is raised it will form a closure for the front end of the bowl, and means to raise the unit to such position.

16. A scraper including a dumping bowl normally clear of the ground, an apron and scraping blade unit separate from but movably mounted in connection with the bowl to scrape dirt and deliver the same into the bowl, a draft element attached to the scraper to haul the same and movable forwardly relative thereto from a predetermined normal position, catch means normally holding the element against such movement, means functioning with the loading of a predetermined weight of dirt into the bowl to release the catch means to permit relative forward movement of the draft element, means between the draft element and apron unit to raise the latter with such forward movement of the element, such means including a longitudinally movable horizontal bar and a pull-link flexibly connected thereto, said bar and link being capable of vertical movement at their adjacent ends, catch means under the bar and adjacent the link to hold the bar against retractive movement when the apron unit is raised, and means applied to the bar to raise the same at will to disengage the catch means and permit of retractive movement of the bar and lowering of the apron unit.

17. A scraper including a dumping bowl normally clear of the ground, an apron and scraping blade unit separate from but movably mounted in connection with the bowl to scrape dirt and deliver the same into the bowl, a draft element attached to the scraper to haul the same and movable forwardly relative thereto from a predetermined normal position, means connecting the draft element to the apron unit to raise the latter with the forward movement of the element, catch means normally preventing such movement, and means to release the catch means.

18. A scraper including a dumping bowl normally clear of the ground, an apron and scraping blade unit separate from but movably mounted in connection with the bowl to scrape dirt and deliver the same into the bowl, a draft element attached to the scraper to haul the same and movable forwardly relative thereto from a predetermined position, the draft element including a horizontal bar and link unit, means between the draft element and apron unit to raise the latter with the forward movement of the element, a vertical arm pivoted in a fixed position at one end and at its other end pivoted on the forward end of the link, catch means engaging the bar to hold the same against retractive movement after the apron has been raised, a second horizontal bar extending rearwardly from and pivoted on the arm intermediate the ends of the latter, a catch pin engaging the second bar and holding the same from forward movement when the link is in its rearmost position relative to the scraper, and means for raising said second bar from engagement with the pin.

19. A structure as in claim 18, in which said last named means comprises a vertically movable yoke with which said second bar is slidably engaged, and means actuated by reason of a load of predetermined weight in the bowl to raise said yoke.

20. A structure as in claim 18, in which the link and first named bar are connected together for limited longitudinal sliding movement, whereby when the first named bar is advanced and held, the link and second named bar may be retracted so as to reengage said second named bar with the catch pin.

21. A scraper including a frame, a bowl turnably supported from the bowl in a manner to cause the bowl to tend to rotate forwardly when loaded, a blade and apron unit pivoted on the frame ahead of the bowl and arranged to scrape dirt and deliver the same into the bowl, means to raise the unit, catch means normally preventing the functioning of said raising means, and means to release the catch means with the forward rotation of the bowl.

22. A structure as in claim 21, in which said last named means comprises a lug projecting radially from the bowl, a member whose rear end normally engages the lug, a longitudinally extending lever pivoted at its rear end on the frame, a depending extension on the rear end of the lever on which said member is mounted whereby a forward pressure on the latter will tend to lift the forward end of the lever, and means between such end of the lever and the catch means to release the latter with such lifting of the lever.

23. A structure as in claim 21, in which said last named means comprises a lug projecting radially from the bowl, a member whose rear end normally engages the lug, a movable lever on which the member is pivoted intermediate its ends, said lever being arranged to be moved by a forward pressure on the member, means between the lever and catch means to disengage the latter with a movement of the lever, and hand means applied to the member to turn the same on its pivot and move it clear of the lug at will.

24. A scraper including a turnable dumping bowl normally clear of the ground, an apron and scraping blade unit separate from and projecting forwardly from the bowl, in clearance relation thereto, regardless of the turning of the bowl, means pivoting the unit at its rear end in front of and adjacent the plane of the bottom of the bowl when the latter is in its normal position, and means applied to the unit to lower the front end of the same to the ground and to raise the unit clear of the ground.

25. A structure as in claim 24, with separate means to release the bowl whereby to permit the same to dump.

In testimony whereof I affix my signature.

COLLIS P. RENAUD.